United States Patent [19]

Jepson et al.

[11] 4,316,798

[45] Feb. 23, 1982

[54] SEPARATING CHAMBER FOR A MAGNETIC SEPARATOR

[75] Inventors: Walter B. Jepson; Peter W. Riley; David Hocking, all of St. Austell, England

[73] Assignee: English Clays Lovering Pochin & Company Ltd., St. Austell, England

[21] Appl. No.: 176,015

[22] Filed: Aug. 7, 1980

Related U.S. Application Data

[63] Continuation-in-part of Ser. No. 14,221, Feb. 22, 1979, abandoned.

[30] Foreign Application Priority Data

Feb. 27, 1978 [GB] United Kingdom ............... 7779/78

[51] Int. Cl.³ ..................... B03C 1/02; B01D 35/06
[52] U.S. Cl. ............................... 209/223 R; 209/232; 210/222
[58] Field of Search ............... 209/223 R, 231, 232, 209/214, 236; 210/222, 223, 349, 489, 437, 315, 440, 443; 55/100, 418, 128, 129

[56] References Cited

U.S. PATENT DOCUMENTS 1,780,882  11/1930  Kettler ........................... 210/315 X
3,246,765   4/1966  Murphy et al. ................. 210/489 X
4,120,783  10/1978  Baummer ....................... 209/496 X
4,124,503  11/1978  Watson .......................... 209/232 X

FOREIGN PATENT DOCUMENTS

2615581  10/1976  Fed. Rep. of Germany ...... 209/232
1469765   4/1977  United Kingdom .

Primary Examiner—Ralph J. Hill
Attorney, Agent, or Firm—Weingram & Klauber

[57] ABSTRACT

A separating chamber for a magnetic separator is disclosed, which separating chamber includes a canister having at least one inlet and at least one outlet and a fluid-permeable magnetisable packing material within the canister. When feed material from which magnetisable particles are to be separated is supplied to the inlet(s), it passes into the packing material by way of a fluid-permeable partition which serves to distribute the feed material over a large area within the packing material. By virtue of an externally applied magnetic field, magnetisable particles within the feed material are magnetically attracted to collecting sites within the packing material. So as to mitigate the effect of fluid passing through apertures in the partition which tends to produce high velocity jets, thereby prejudicing the separation efficiency, the partition is double-walled, the two walls being spaced slightly apart and being apertured. Venting means are provided for preventing air becoming entrapped in the highest part of the canister.

16 Claims, 9 Drawing Figures

SEPARATING CHAMBER FOR A MAGNETIC SEPARATOR

This application is a continuation-in-part of Ser. No. 14,221 filed 2-22-79, now abandoned.

This invention relates to a separating chamber for a magnetic separator.

According to a first aspect of the present invention, there is provided, in a magnetic separator which comprises a separating chamber, magnetic field producing means for establishing a magnetic field in a predetermined zone, and means for moving the separating chamber between the predetermined zone and a zone remote from the predetermined zone, the improvement which comprises:

a separating chamber comprising (i) a canister having at least one inlet and at least one outlet for a fluid suspension including magnetisable particles which are desired to be separated; (ii) a fluid-permeable magnetisable packing material for capturing said magnetisable particles, being disposed within the canister so that said fluid suspension supplied to the inlet(s) passes through the packing material and exits through the outlet(s); (iii) a first, fluid-permeable, double-walled partition through which said fluid suspension from the inlet(s) must pass to reach the packing material, the two walls of the partition being spaced slightly apart and being apertured, with the apertures in one wall being offset from the apertures in the other wall, to cause the fluid suspension to follow a tortuous path as it passes through the double-walled partition and into the packing material; and (iv) a second, fluid-permeable partition through which fluid suspension from the inlet(s) which has passed through the packing material must pass to reach the outlet(s), said packing material occupying the volume between said double-walled partition and the second fluid-permeable partition.

According to a second aspect of the present invention, there is provided, in a magnetic separator which comprises a separating chamber, magnetic field producing means for establishing a magnetic field in a predetermined zone, and means for moving the separating chamber between the predetermined zone and a zone remote from the predetermined zone, the improvement which comprises:

a separating chamber comprising (i) a canister having at least one inlet and at least one outlet for a fluid suspension including magnetisable particles which are desired to be separated; (ii) a fluid-permeable magnetisable packing material for capturing said magnetisable particles, being disposed within the canister so that said fluid suspension supplied to the inlet(s) passes through the packing material and exits through the outlet(s); (iii) a first, fluid-permeable, double-walled partition through which said fluid suspension from the inlet(s) must pass to reach the packing material, the two walls of the partition being spaced slightly apart and being apertured, with the apertures in one wall being offset from the apertures in the other wall, to cause the fluid suspension to follow a tortuous path as it passes through the double-walled partition and into the packing material; and (iv) a second, fluid-permeable partition through which fluid suspension from the inlet(s) which has passed through the packing material must pass to reach the outlet(s), the said packing material occupying the volume between said double-walled partition and the second fluid-permeable partition, wherein the walls of the double-walled partition are spaced apart by a distance in the range of from 2 to 10 millimeters.

According to a third aspect of the present invention, there is provided, in a magnetic separator which comprises a separating chamber, magnetic field producing means for establishing a magnetic field in a predetermined zone, and means for moving the separating chamber between the predetermined zone and a zone remote from the predetermined zone, the improvement which comprises:

a separating chamber comprising (i) a canister having at least one inlet and at least one outlet for a fluid suspension including magnetisable particles which are desired to be separated; (ii) a fluid-permeable magnetisable packing material for capturing said magnetisable particles, being disposed within the canister so that said fluid suspension supplied to the inlet(s) passes through the packing material and exits through the outlet(s); (iii) a first, fluid-permeable, double-walled partition through which said fluid suspension from the inlet(s) must pass to reach the packing material, the two walls of the partition being spaced slightly apart and being apertured, with the apertures in one wall being offset from the apertures in the other wall, to cause the fluid suspension to follow a tortuous path as it passes through the double-walled partition and into the packing material; and (iv) a second, fluid-permeable partition through which fluid suspension from the inlet(s) which has passed through the packing material must pass to reach the outlet(s), the said packing material occupying the volume between said double-walled partition and the second fluid-permeable partition, wherein the distance between the first and second, fluid-permeable partitions is substantially greater than the distance between the two walls of the first, fluid-permeable, double-walled partition.

According to a fourth aspect of the present invention, there is provided, in a magnetic separator which comprises a separating chamber, magnetic field producing means for establishing a magnetic field in a predetermined zone, and means for moving the separating chamber between the predetermined zone and a zone remote from the predetermined zone, the improvement which comprises:

a separating chamber comprising (i) a canister having at least one inlet and at least one outlet for a fluid suspension including magnetisable particles which are desired to be separated; (ii) a fluid-permeable magnetisable packing material for capturing said magnetisable particles, being disposed within the canister so that said fluid suspension supplied to the inlet(s) passes through the packing material and exits through the outlet(s); (iii) a first, fluid-permeable, double-walled partition through which said fluid suspension from the inlet(s) must pass to reach the packing material, the two walls of the partition being spaced slightly apart and being apertured, with the apertures in one wall being offset from the apertures in the other wall, to cause the fluid suspension to follow a tortuous path as it passes through the double-walled partition and into the packing material; and (iv) a second, fluid-permeable partition through which fluid suspension from the inlet(s) which has passed through the packing material must pass to reach the outlet(s), the said packing material occupying the volume between said double-walled partition and the second fluid-permeable partition, wherein the distance between the first, fluid-permeable, double-walled partition and the second, fluid-permeable partition is sustantially greater than the distance between the two walls of the first, fluid-permeable, double-walled partition and the walls of the double-walled partition are spaced apart by a distance in the range of from 1 to 10 millimeters.

A separator according to the present invention is advantageous when it is used, as follows. As a fluid suspension containing magnetisable particles is passed through packing material with the object of magnetically capturing magnetisable particles within the packing material, the efficiency of capture of magnetisable particles within the packing material depends on the velocity at which the magnetisable particles pass through the packing material. Preferably, the inner of the two apertured walls is provided to distribute the fluid suspension evenly across the cross-section of the packing material transverse to the general direction of flow of the fluid. However, in the absence of the outer of the two apertured walls, high velocity and streamlined jets of fluid suspension would enter the packing material after passing through the apertures in the inner apertured wall and this could prejudice the separating efficiency. The outer apertured wall not only decreased the velocity of these jets of fluid suspension prior to passage of the fluid through the packing material, but also results in a tortuous flow of the fluid suspension as it passes through the double-walled partition and into the packing material, thus improving the efficiency of capture of magnetisable particles. Ideally, the apertures are offset in such a manner that no aperture in one wall overlaps an aperture in the other wall when viewed from a direction perpendicular to the wall at that point. However, in practice it is possible to tolerate some overlapping of the apertures.

Conveniently, the canister is an elongate rigid canister and the partitions divide the space within the canister into several compartments, each of which extends substantially the full length of the canister; and the form and disposition of the partitions and the packing material are such that fluid suspension supplied to the inlet(s) passes through the packing material in a general direction transverse to the axis of the canister, and the linear velocity of the fluid suspension decreases as it passes through the packing material. For example, the cross-sectional area of the packing material transverse to the general direction of flow of the fluid suspension could increase in the general direction of flow of the fluid suspension.

The separator could include venting means for venting a space in the upper part of the canister in use of the separating chamber.

Preferably the venting means is a tube having its inlet in the vicinity of the highest point within the separating chamber and its outlet surrounded by an outlet of the canister.

Such a construction is particularly useful if the canister is elongate and the inlet(s) and outlet(s) are provided in an end or the ends of the canister which is disposed with its axis horizontal in use. In this case, the venting means serves to prevent air becoming entrapped in the highest part of the canister above the inlet and outlet.

Preferably, the partitions are in the form of tubes, disposed one within the other with their axes aligned along the axis of the canister, and preferably the or each inlet leads into the space within the inner partition and the or each outlet leads out of the space between the outer partition and the canister.

Advantageously, plates are rigidly fixed within the compartment between the two partitions and spaced apart within the packing material along the length of the canister so as to divide this compartment into a plurality of sub-compartments, each of the plates being disposed transverse to the axis of the canister.

In order that the present invention may be more fully understood, an embodiment of a magnetic separator according to the present invention will now be described, by way of example, with reference to the accompanying drawings, in which.

Figure 1:
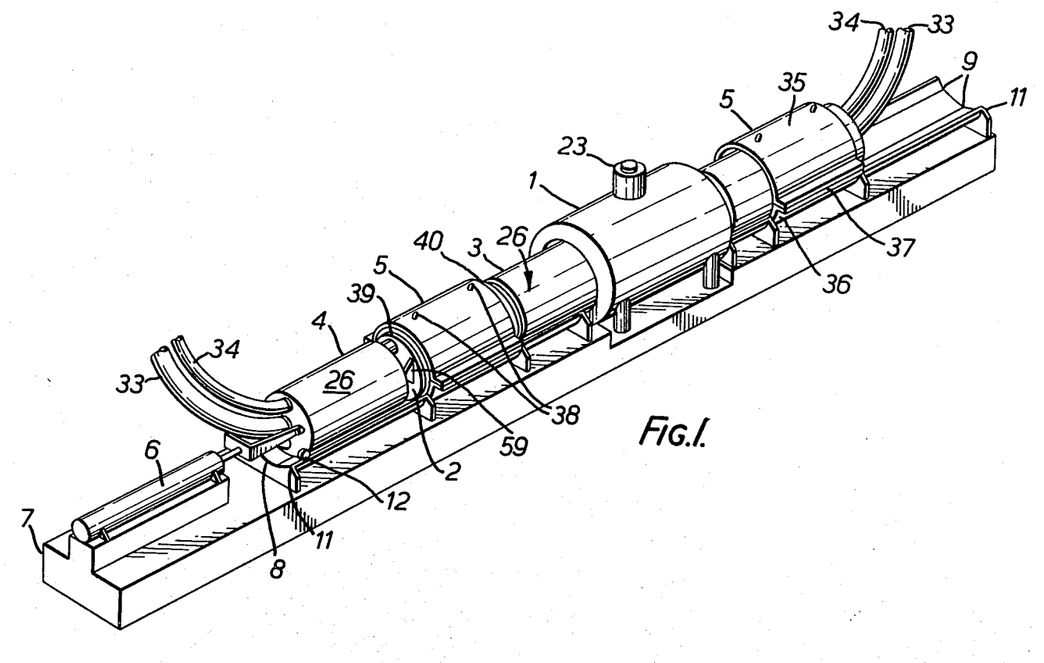
FIG. 1 is a perspective view of this embodiment.
Figure 2:
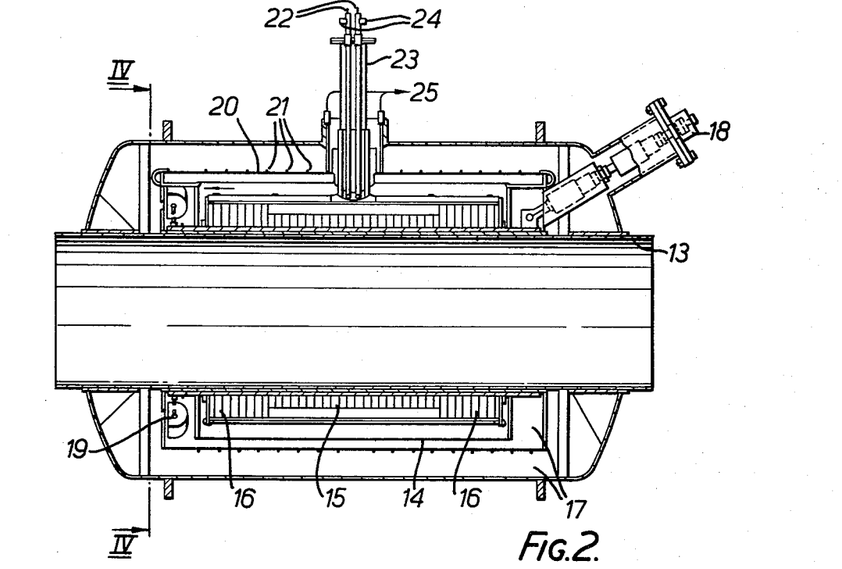
FIG. 2 is a longitudinal sectional view through a superconducting electromagnet forming part of this embodiment.
Figure 3:
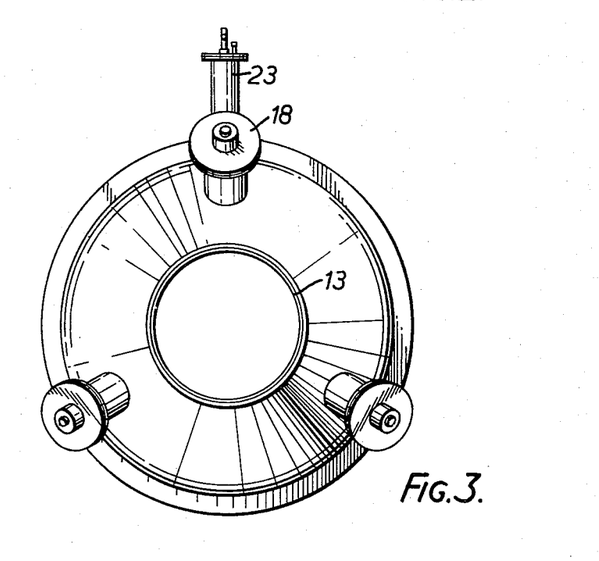
FIG. 3 is an end view of the superconducting electromagnet from the right as shown in FIG. 2.
Figures 4, 5:
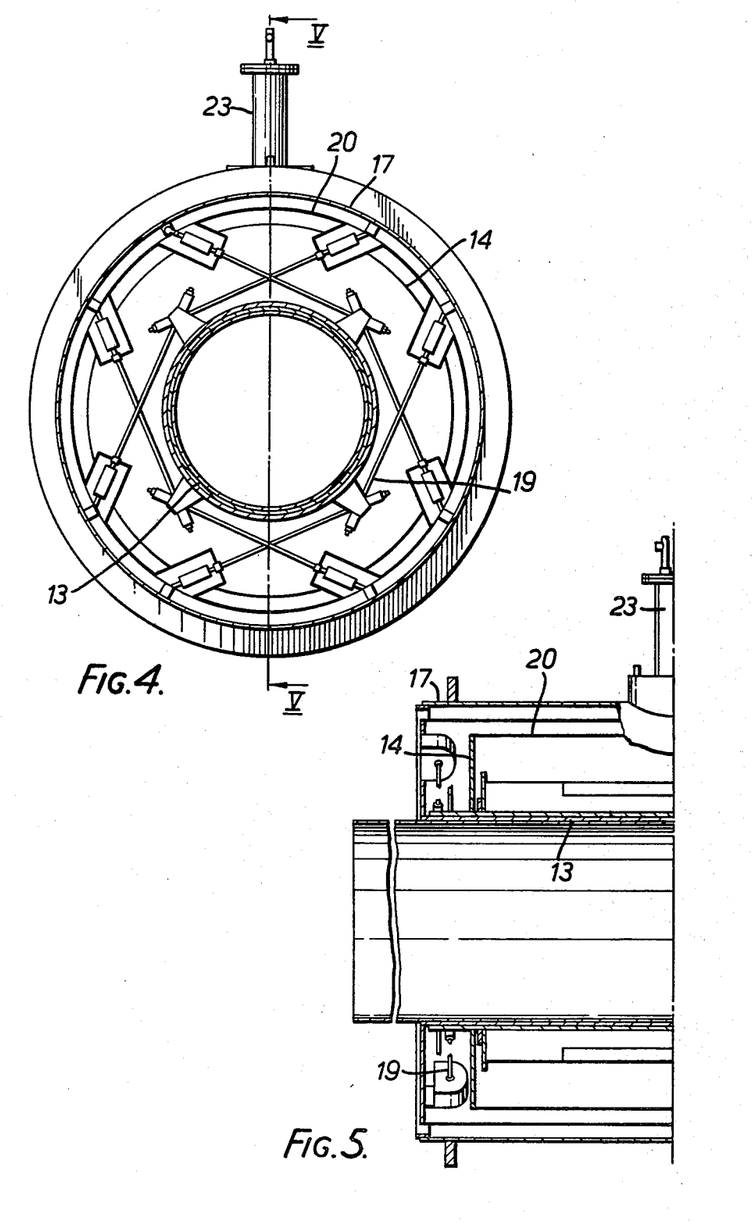
FIG. 4 is a cross-sectional view through the superconducting electromagnet taken along the line IV—IV in FIG. 2.
FIG. 5 is a sectional view of part of the superconducting electromagnet taken along the line V—V in FIG. 4.

Referring to FIG. 1, the magnetic separator illustrated therein comprises a superconducting electromagnet 1, two separating chambers 2, a central compensating element 3, two outer compensating elements 4, two ferromagnetic cylindrical shields 5, moving means in the form of a hydraulic ram 6, and a concrete base 7. The moving means may also be a pneumatic ram or a mechanical device such as a rack and pinion system.

The two separating chambers and the three compensating elements are articulated together to form a train of elements which can be reciprocated by means of the hydraulic ram 6 between a first position in which the first separating chamber is in a predetermined zone within the bore of the electromagnet 1 and the second separating chamber is in a first remote zone within the first ferromagnetic shield, and a second position in which the second separating chamber is in the predetermined zone within the bore of the electromagnet 1 and the first separating chamber is in a second remote zone within the second ferromagnetic shield. Each ferromagnetic cylindrical shield 5 which is of slightly greater diameter than each of the separating chambers comprises two semicylindrical halves 35 and 36 having flanges 37 which are bolted together. Furthermore each shield 5 may have a wall thickness in the range from 25 mm to 50 mm and preferably about 38 mm. Lifting eyes 38 are provided on the upper halves to enable them to be removed to facilitate removal and replacement of the compensating elements and separating chambers which make up the train. When a separting chamber is within a cylindrical shield 5, the separating chamber is magnetically screened by this shield as well as by a first soft iron disc 39 of 38 mm thickness attached to the outer end of the separating chamber and a second soft iron disc 40 of the same thickness which is connected to the central compensating body 3 by mounting screws 66 and spaced from the compensating body 3 by spacers 67 (see FIG. 8). In operation a magnetic field is established in the predetermined zone within the bore of the electromagnet 1.

The moving means is advantageously constituted by two hydraulic rams, such as 6, one disposed at either end of the train. Reciprocating movement of the train may then be achieved by alternately pulling the train with each of the rams and it is not necessary to exert a pushing force on the train which may cause the train to skate from side to side.

The train is supported by an arcuate supporting surface 8 in which are set sliding strips 9 of aluminium-bronze alloy lubricated with oil. Further sliding strips (not shown) are provided along the uppermost part of the bore of the superconducting electromagnet 1 and along the uppermost parts of the bores of the ferromagnetic shields 5. The sliding strips may also be strips of plastics material which exhibit a low coefficient of sliding friction, but it is preferred to use a porous bearing metal to which oil is supplied. Strips of stainless steel 10 (see FIG. 7) are attached to the outside of the separating chambers 2 and the compensating elements 3, 4 and co-operate with the sliding strips. The end portions of the supporting surface 8 extend upwardly to form guide rails 11 on which run rollers 12 mounted on the outer ends of the outer compensating elements 4 in order to prevent rotation of the train about its longitudinal axis.

Figure 8:
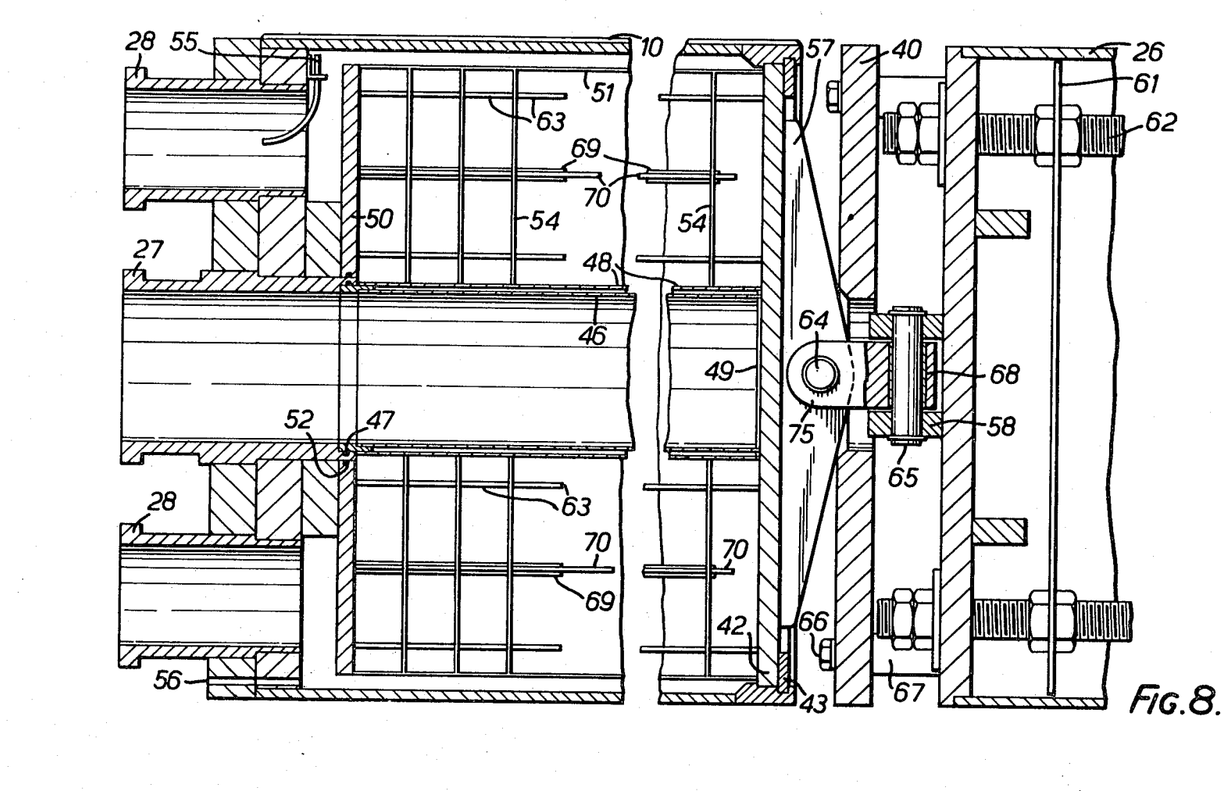
FIGS. 8 and 9 show details of the separating chamber.

Each compensating element 3, 4 is an assembly comprising an outer, cylindrical casing 26 and six spaced apart discs of ferromagnetic material, preferably soft iron, such as the disc 61 shown in FIG. 8, the assembly being held together by four threaded longitudinal tie rods such as 62. The outer casing 26 and the tie rods are of non-magnetic material, the casing 26 preferably being made of austenitic stainless steel. The thickness, number and position of the ferromagnetic discs in the compensating elements are chosen to be such that, when a separating chamber containing ferromagnetic packing material is withdrawn from the bore of the electromagnet 1 and a compensating element is drawn into the bore or vice versa, the force opposing the withdrawal of the separating chamber or compensating element from the bore is virtually balanced by the force tending to draw the compensating element or separating chamber into the bore. The thickness of each disc is preferably in the range from 3 to 12 mm and is most preferably about 6 mm, and the distance between adjacent discs is preferably in the range from 50 to 200 mm and most preferably in the range from 90 to 120 mm. The size and magnetic capacity of each compensating element is chosen to be of the same order of magnitude as the size and magnetic capacity of each separating chamber. Thus, if each separating chamber has an internal diameter of about 600 mm and an internal length of about 900 mm, the outer diameter of each compensating element is preferably about 660 mm and the total length of the central compensating element 3 is about 1080 mm and of each outer compensating element 4 is about 2390 mm. However the outer diameter of each compensating element may be as small as 300 mm or as large as 1600 mm depending on the size of the magnetic separator.

Referring to FIGS. 2 to 5, the electromagnet 1 comprises a central tube 13 surrounding the bore and an annular vessel 14 for containing liquid helium surrounding the tube 13. The electromagnet 1 further comprises a series of electromagnet coil 15, 16 disposed in the vessel 14 and wound from a superconductor consisting of filaments of niobium titanium alloy surrounded by copper. The coils may also be wound from a superconductor consisting of filaments of aluminium of extremely high purity, a niobium tin alloy or a niobium titanium alloy. The electromagnet coils 16 near the ends of the tube 13 have a greater number of windings than the more central coils 15 in order to compensate for fall-off of magnetic field intensity near the ends. The liquid helium is conveniently supplied by a suitable continuous liquifaction plant. The vessel 14 is suspended within an evacuated vessel 17 having silvered inner walls at one end by means of three substantially rigid struts 18 comprising at least a portion of material of low thermal conductivity arranged in tripod formation and at the other end by means of stainless steel rods 19 which are relatively flexible arranged in the manner of the spokes of a wire wheel in order to accommodate radial and longitudinal expansion and contraction of the vessel 14. This method of suspending the vessel 14 allows for thermal expansion and contraction as the temperature of the vessel 14 is raised or lowered, whilst at the same time minimising the conduction of heat from outside the vessel 17 to the vessel 14. A thermal shield 20 of good conductivity, for example copper, is disposed between the outer wall of the vessel 14 and the inner wall of the evacuated vessel 17 and is cooled to a temperature intermediate that of liquid helium and the outside temperature, preferably in the range from 25° K. to 100° K. Advantageously the shield 20 is cooled to about 50° K. by means of tubes 21 attached to the shield 20 carrying helium vapour boiling off from the liquid helium in the vessel 14. Electrical leads 22 for supplying power to the electromagnet coils 15, 16 pass into the vessel 14 by way of a tube 23 which is also cooled by helium vapour boiling off from the liquid helium, thus minimising conduction of heat down the leads 22. Helium vapour is discharged from outlets 24 and 25 and is returned to a refrigerator for religuifaction.

Figure 6:
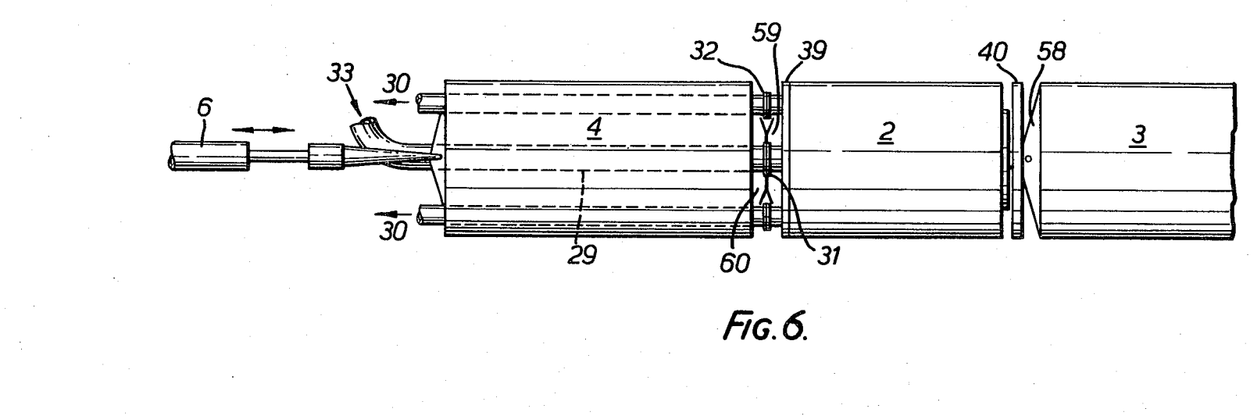
FIG. 6 is a diagram showing the arrangement of various elements of the embodiment.
Figure 7:
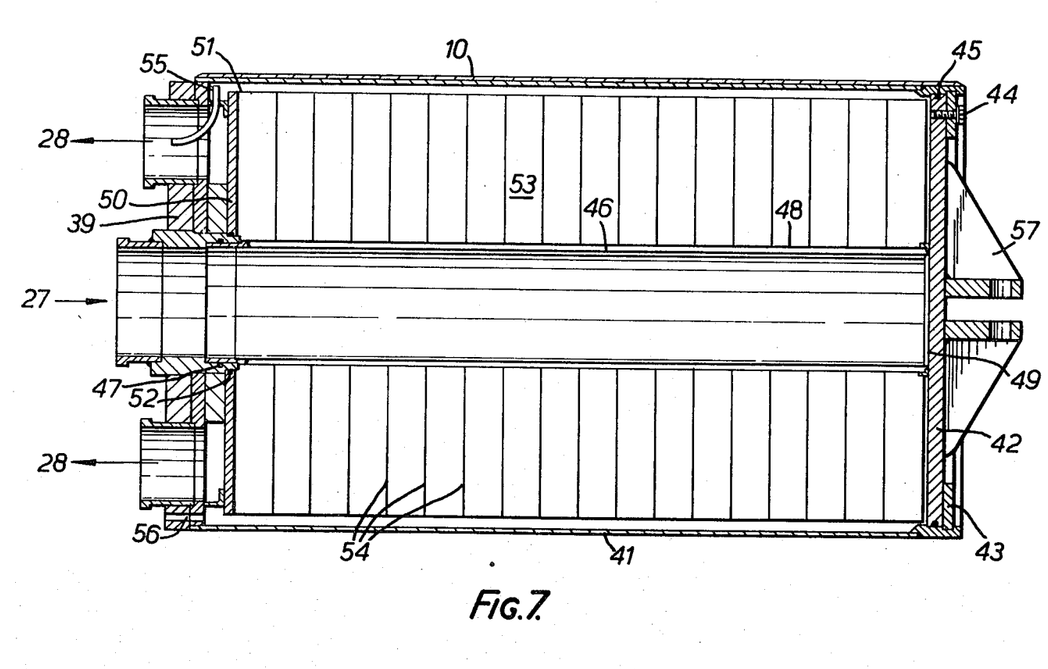
FIG. 7 is a longitudinal sectional view through a separating chamber forming part of this embodiment.

Referring to FIG. 7, each separating chamber 2 is provided with an inlet 27 for feed suspension and two outlets 28 for product suspension which is substantially free of magnetisable material. Referring also to FIG. 6, the inlet 27 is connected to a conduit 29 and each outlet 28 is connected to a respective conduit 30 by means of coupling means 31 and 32 respectively which allow movement of the inlet 27 and the outlets 28 with respect to the conduits 29 and 30. The conduits 29 and 30 pass through the outer compensating element adjacent the separating chamber and are connected respectively to a flexible conduit 33 for feed suspension and a flexible coinduit 34 (see FIG. 1) for product suspension. Each separating chamber 2 also comprises a rigid canister constituted by a cylindrical casing of circular cross-section and a removable lid 42 which is held firmly in place on the casing 41 by four arcuate locking members 43 which are secured by screws 44. A water-tight O-ring seal 45 is provided between the rim of the lid 42 and the casing 41. The inlet 27 communicates with an apertured feed tube 46, an O-ring seal 47 being provided between the feed tube 46 and the inlet 27. An apertured diffuser tube 48 is disposed coaxially around the feed tube 46, the spacing between the two tubes 46 and 48 being about 5 mm. This spacing may in fact vary between 2 and 10 mm although it is preferably in the range from 4 to 6 mm. The apertures in the diffuser tube 48 are offset relative to the apertures in the feed tube 46 to cause the feed suspension to follow a tortuous path as it passes from within the feed tube 46 into a ferromagnetic packing material 53 disposed around the diffuser tuber 48. In the absence of the diffuser tube 48 the feed suspension would enter the packing material in the form of high velocity jets, possibly having a velocity as high as 22,000 cm/min, and this high velocity would effectively prevent magnetisable particles from becoming magnetically entrained within the packing material. The presence of the diffuser tube 48 reduces the velocity of these jets and may even render the velocity of these jets of the same order of magnitude as the velocity of the fluid elsewhere in the packing material, that is 30 to 1,000 cm/min.

Figure 9:
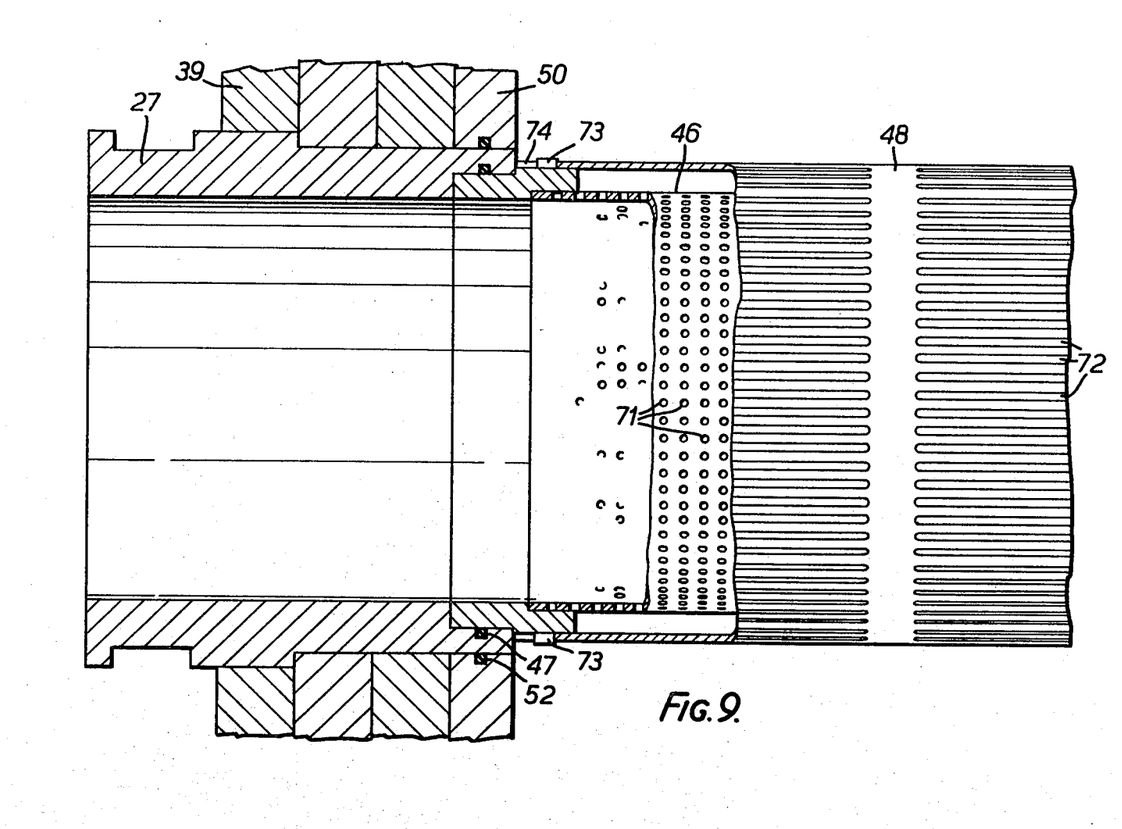

As may be seen from the enlarged view of an end of the tubes 46 and 48 shown in FIG. 9, the feed tube 46 is preferably provided with circular holes 71 and the diffuser tube is preferably provided with slots 72. The size and distribution of the holes 71 in the feed tube 46 are chosen such as to evenly distribute the feed suspension along the length of the tube as it passes into the packing material by causing a pressure drop in the suspension. Preferably the holes 71 occupy an area in the range from 2% to 10%, and most preferably 4% to 5%, of the total area of tube surface (including the holes). Thus the holes 71 may be evenly distributed at a density of sixteen holes per square inch if the holes are of about 2 mm diameter, that is with the centres of the holes spaced apart by about 12 mm. However the diameter of the holes may vary between 1 and 4 mm and is preferably in the range from 2 to 3 mm. The feed tube 46, which is for example of about 150 mm diameter, may be formed by bending a preformed apertured sheet. The diffuser tube 48, which preferably surrounds the feed tube 46 at a distance in the range from 2 to 10 mm, and most preferably in the range from 4 to 6 mm, has axially extending slots 72 which are offset circumferentially from the holes 71 so as to decrease the velocity of the jets of feed suspension passing through the holes 71 in the feed tube 46, thus increasing the chance of the magnetisable particles in the feed suspension being captured within the packing material. The slots 72 may each be about 3 mm wide and about 70 mm long, the centres of adjacent slots being spaced apart by about 6 mm. The slots 72 are arranged end to end along the length of the diffuser tube with the ends of longitudinally adjacent slots being spaced apart by about 12 mm. The diffuser tube 48 is located within the separating chamber by pins 73 extending through slots 74 in the tube 48. Although the holes 71 are shown as not overlapping the slots 72 in FIG. 9, it should be mentioned that, in practice, some overlap can be tolerated.

The packing material is preferably of the randomly orientated ferromagnetic filament type such as ferromagnetic stainless steel wool. However other types of packing material such as ferromagnetic particles, foam material or filaments packed singly or in bundles may also be used. Referring again to FIG. 7, a rubber gasket 49 is provided on the inside of the lid 42 to seal the open ends of the tubes 46 and 48. The packing material 53 is contained by the tube 48, the lid 42, an annular end plate 50 surrounding the inlet 27 and a foraminous cylindrical single-walled partition 51 coaxial with the tubes 46 and 48, which tubes together form a double-walled partition. The partition 51 is separated from the wall of the casing 41 by a distance of from about 10 mm to about 50 mm. A water-tight O-ring seal 52 is provided between the inner edge of the plate 50 and the inlet 27. The compartment containing the packing material 53 is divided up into a plurality of annular sub-compartments by eighteen fluid-impermeable annular plates 54 which are fixed at the desired spacing by four threaded tie rods 70 as shown in FIG. 8, which shows an enlarged view of the ends of the separating chamber. The annular plates 54 are spaced apart by pointed pins 63, 69 provided on the left hand face of each of the plates 54, which pins extend into depressions in the right hand face of an adjacent plate 54. The pins 69 are hollow in order that they may accommodate the tie rods 70. The pins 63, 69 also serve to reinforce the packing material so as to decrease compaction of the packing material by the fluid. Preferably twenty pins 63 each of 6 mm diameter are provided between each pair of adjacent plates, together with four hollow pins 69 each of 12 mm diameter for accommodating the tie rods 70 which are preferably of 3 mm to 6 mm diameter. However the diameter of the pins 63 may vary between 3 and 12 mm and the total number of pins 63 and 69 may vary between 10 and 30. The thickness of the plates 54 is preferably about 3 mm and the centres of adjacent plates are spaced apart by about 50 mm. However the thickness may vary between 2 and 8 mm and the spacing may vary between 25 and 100 mm. The annular plates 54 reduce any permanent compression of the packing material caused by repeated movements of the separating chamber into and out of the bore of the electromagnet 1 under the action of magnetic forces.

The packing material is initially packed into the annular sub-compartments so that about 95% of the available volume is void (i.e. not actually filled with steel). In use, feed suspension enters through the inlet 27 and passes through the tubes 46 and 48. It then flows substantially radially through the packing material 53 and passes through the apertures in the partition 51 into the annular space between this partition and the casing 41 and out of the outlets 28. As shown in FIG. 7, a tube 55 is provided at the uppermost outlet 28 with its inlet opening near the highest point within the separating chamber and its outlet in the centre of that outlet 28 where the flow velocity of the suspension is high. The function of this tube 55 is to withdraw any air which may collect in the uppermost part of the separating chamber. The tube 55 acts with the outlet 28 into which it extends as an ejector or extractor pump. The rapid flow of suspension in the vicinity of the outlet of the tube 55 entrains the air to be extracted from the separating chamber and draws it out of the separating chamber. The tube 55 preferably has a diameter in the range from 3 to 15 mm and most preferably in the range from 6 to 12 mm. The inlet of the tube 55 is preferably less than 6 mm below the inside of the casing 41. The outlet may be in the form of a venturi tube. A drain hole 56 is provided at the lowermost part of the separating chamber to enable the chamber to be completely emptied. With the exception of the packing material all the components of the separating chamber are of substantially non-magnetisable material.

Referring to FIGS. 6, 7 and 8, each separating chamber is coupled to the central compensating element 3 by means of a universal joint comprising a clevis 57 which forms part of the lid 42, a pin 64 which connects the clevis 57 to a coupling member 75 extending through an aperture in the soft iron disc 40, and a second pin 65 at right angles to the first pin which connects the coupling member to a clevis 58 on the central compensating element 3. The separating chamber is coupled to the associated outer compensating element 4 by means of a clevis 59 which forms part of the casing 41 and which is connected to a clevis 60 on the outer compensating element 4 by a pin (not shown). The articulation of the elements of the train by the system of clevises and pins described above permits any elements in the train to be removed and replaced without affecting the other elements of the train. This is especially important when it is desired to replace a separating chamber, the packing material of which has become choked with captured magnetisable particles. The holes in the clevises and the coupling member which receive the connecting pins are provided with resilient bushings, such as the bushing 68 for the pin 65, to allow for tolerances in manufacture and any slight misalignment of the elements of the train.

The magnetic separator described above with reference to the drawings operates as follows. When the apparatus is operating, a magnetic field is continuously established in the predetermined zone within the bore of the electromagnet 1. The intensity of the magnetic field generated in the bore of the electromagnet 1 may be in the range from 2.5 tesla to 10.0 tesla, but is advantageously about 5 tesla. It is convenient to supply the coils 15, 16 with direct current at a relatively low voltage, for example in the range from 5 to 50 volts and preferably about 15 volts. The coils are preferably energised by increasing the current gradually from zero to a maximum in the range from 500 to 1500 amps. With one of the separating chambers 2 within the predetermined zone and the other separating chamber 2 within the bore of one of the shields 5, feed suspension, for example a clay slurry, is introduced into the one separating chamber by way of the inlet 27. This feed suspension passes into the packing material 53 after following a tortuous path in passing through the tubes 46 and 48. The packing material 53 has been magnetised by the magnetic field and thus magnetisable particles in the feed suspension are magnetised and attracted to the magnetisable material 53 as the feed suspension passes with decreasing linear velocity radially through the magnetisable material 53. The product suspension which is substantially free of magnetisable particles passes out of the separating chamber via the outlets 28. Optionally clean water is then passed through the separating chamber from the inlet to the outlets to flush out any substantially non-magnetisable particles which may have become mechanically entrained in the packing material. The hydraulic ram 6 is then actuated to move the train into a position in which the one separating chamber is within the bore of the other shield 5 and the other separating chamber is within the predetermined zone. Feed suspension is then passed through the other separating chamber in the same way as feed suspension was passed through said one separating chamber. Simultaneously the packing material of the one separating chamber within the bore of the other shield 5 may be regenerated, for example by rinsing the magnetisable particles out of the packing material with clean water optionally after having demagnetised the packing material. During this regeneration operation the separating chamber is shielded from the magnetic field applied by the electromagnet 1 by the shield 5 and the soft ion discs 39 and 40. Finally the train is moved back to its original position with the one separating chamber within the predetermined zone and the other separating chamber within the bore of the one shield 5. The packing material of the other separating chamber may then be regenerated while further feed suspension is supplied to the one separating chamber. This separation cycle may be repeated many times with the magnetic field continuously applied.

The magnetic separator described above is a wet magnetic separator and is suitable for a wide range of separations in the mineral and chemical industries. It is especially adapted for separating magnetisable impurities from kaolinitic clays.

There will now be set forth some dimensions and dimension ratios in respect of three particular embodiments of the above-described separator, namely embodiments A,B and C, the dimensions being in millimeters.

| Embodiment | 1<br>Inner diameter<br>of separating<br>chamber | 2<br>Diameter of<br>tube 46 | 3<br>Spacing<br>46–48 | 4<br>Spacing<br>48–51 | 5<br>Spacing<br>51–41 | Ratio<br>4/3 |
|---|---|---|---|---|---|---|
| A | 300 | 25–80 | 2–10 | 60–125 | 10–40 | 6–62.5 |
| B | 600 | 50–200 | 2–10 | 140–260 | 10–50 | 14–130 |
| C | 1600 | 50–200 | 2–10 | 540–760 | 10–50 | 54–380 |
| A | 300 | 50 | 5 | 95 | 25 | 19 |
| B | 600 | 150 | 5 | 196 | 25 | 39 |
| C | 1600 | 150 | 5 | 695 | 25 | 139 |

The upper group of figures gives upper and lower limits for various dimensions and ratios and the lower group gives preferred values for each size of chamber.

It will be seen that, even in the most extreme case, the distance between the diffuser tube 48 and the partition 51 is six times greater than the distance between the feed tube 46 and the diffuser tube 48, and generally the ratio is very much greater. It will also be noted that the spacing between the feed and diffuser tubes does not depend upon the overall diameter of the separating chamber.

If the spacing were more than 10 mm the effect of offsetting the two sets of apertures would begin to diminish and jets of liquid would be more likely to pass straight through both sets of apertures. If the spacing were less than 2 mm the interference with the flow of feed suspension would be unacceptably great.

We claim:

1. In a magnetic separator which comprises a separating chamber, magnetic field producing means for establishing a magnetic field in a predetermined zone, and means for moving the separating chamber between the predetermined zone and a zone remote from the predetermined zone, the improvement which comprises:

a separating chamber comprising (i) a canister having at least one inlet and at least one outlet for a fluid suspension including magnetisable particles which are desired to be separated; (ii) a fluid-permeable magnetisable packing material for capturing said magnetisable particles, being disposed within the canister so that said fluid suspension supplied to the inlet(s) passes through the packing material and exits through the outlet(s); (iii) a first, fluid-permeable, double-walled partition through which said fluid suspension from the inlet(s) must pass to reach the packing material, the two walls of the partition being spaced slightly apart and being apertured, with the apertures in one wall being offset from the apertures in the other wall, to cause the fluid suspension to follow a tortuous path as it passes through the double-walled partition and into the packing material; and (iv) a second, fluid-permeable partition through which fluid suspension from the inlet(s) which has passed through the packing material must pass to reach the outlet(s), the said packing material occupying the volume between said double-walled partition and the second fluid-permeable partition, wherein the distance between the first, fluid-permeable, double-walled partition and the second, fluid-permeable partition is at least six times the distance between the two walls of the first, fluid-permeable, double-walled partition, and the walls of the double-walled partition are spaced apart by a distance in the range of from 2 to 10 millimeters.

2. A magnetic separator in accordance with claim 1, wherein the second partition is single-walled and apertured.

3. A magnetic separator in accordance with claim 1, wherein the canister is an elongate rigid canister and the partitions divide the space within the canister into several compartments each of which extends substantially the full length of the canister.

4. A magnetic separator in accordance with claim 3, wherein plates are rigidly fixed within the compartment between the two partitions and spaced apart within the packing material along the length of the canister so as to divide this compartment into a plurality of sub-compartments, each of the plates being disposed transverse to the axis of the canister.

5. A magnetic separator in accordance with claim 3, where the partitions are in the form of tubes, disposed one within the other with their axes aligned along the axis of the canister.

6. A magnetic separator in accordance with claim 5, wherein the inlet(s) leads into the space within the inner partition and the or each outlet leads out of the space between the outer partition and the canister.

7. A magnetic separator in accordance with claim 1, wherein the form and disposition of the partitions and the packing material are such that fluid suspension supplied to the inlet(s) passes through the packing material in a general direction transverse to the axis of the canister, and the linear velocity of the fluid suspension decreases as it passes through the packing material.

8. A magnetic separator in accordance with claim 7, wherein the cross-sectional area of the packing material transverse to the general direction of flow of the fluid suspension increases in the general direction of flow of the fluid suspension.

9. A magnetic separator in accordance with claim 1, wherein the wall of said double-walled partition which is first encountered by fluid suspension supplied to the inlet(s) is provided with apertures in the form of circular holes and the other wall of said double-walled partition is provided with apertures in the form of slots.

10. A magnetic separator in accordance with claim 9, wherein the circular holes occupy an area in the range of from 2% to 10% of the total surface area (including the holes) of the wall through which they extend.

11. A magnetic separator in accordance with claim 10, wherein the circular holes occupy an area in the range of from 4% to 5% of the total surface area (including the holes) of the wall through which they extend.

12. A magnetic separator in accordance with claim 9, wherein said double-walled partition is in the form of a tube and wherein the slots are offset circumferentially from the circular holes.

13. A magnetic separator in accordance with claim 12, wherein the slots are parallel to the axis of said double-walled partition and are distributed uniformly about the circumference of said double-walled partition.

14. A magnetic separator in accordance with claim 13, wherein the slots are arranged end to end along the length of said double-walled partition.

15. A magnetic separator in accordance with claim 1, wherein the separating chamber includes venting means for venting a space in the upper part of the canister during use of the separating chamber.

16. A magnetic separator in accordance with claim 15, wherein the venting means is a tube having its inlet in the vicinity of the highest point within the separating chamber and its outlet surrounded by an outlet of the canister.

* * * * *